Oct. 16, 1951 A. Y. DODGE 2,571,847
BRAKE
Filed July 12, 1949

INVENTOR:
Adiel Y. Dodge,
BY Dawson, Orms, Brith and Spangenberg,
ATTORNEYS.

Patented Oct. 16, 1951

2,571,847

UNITED STATES PATENT OFFICE 2,571,847

BRAKE

Adiel Y. Dodge, Rockford, Ill.

Application July 12, 1949, Serial No. 104,201

12 Claims. (Cl. 188—79.5)

1

This invention relates to brakes and more particularly to brakes of the type for use on automotive vehicles.

To be satisfactory for commercial use on automotive vehicles and particularly passenger vehicles, brakes should be relatively simple and inexpensive to manufacture, should be easy to repair as by removal and replacement of worn parts, should be readily controllable with a relatively light pedal pressure and should be readily adjustable either manually or automatically. In addition, the brake should operate quietly without clicks or thumps upon application. It is a primary object of the present invention to provide a brake having these several characteristics.

Another object is to provide a brake in which the segments or shoes are applied by a flexible operating band, and the relative movement between the segments and the band is minimized.

Anothre object is to provide a brake in which there is a servo action between certain of the segments to reduce the required pedal pressure.

A still further object is to provide a brake which may be manufactured in two different manners—with either full automatic adjustments or with one manual adjustment to take up tangential clearance, employing two or more automatic adjustors to adjust radial clearance.

Figure 1:
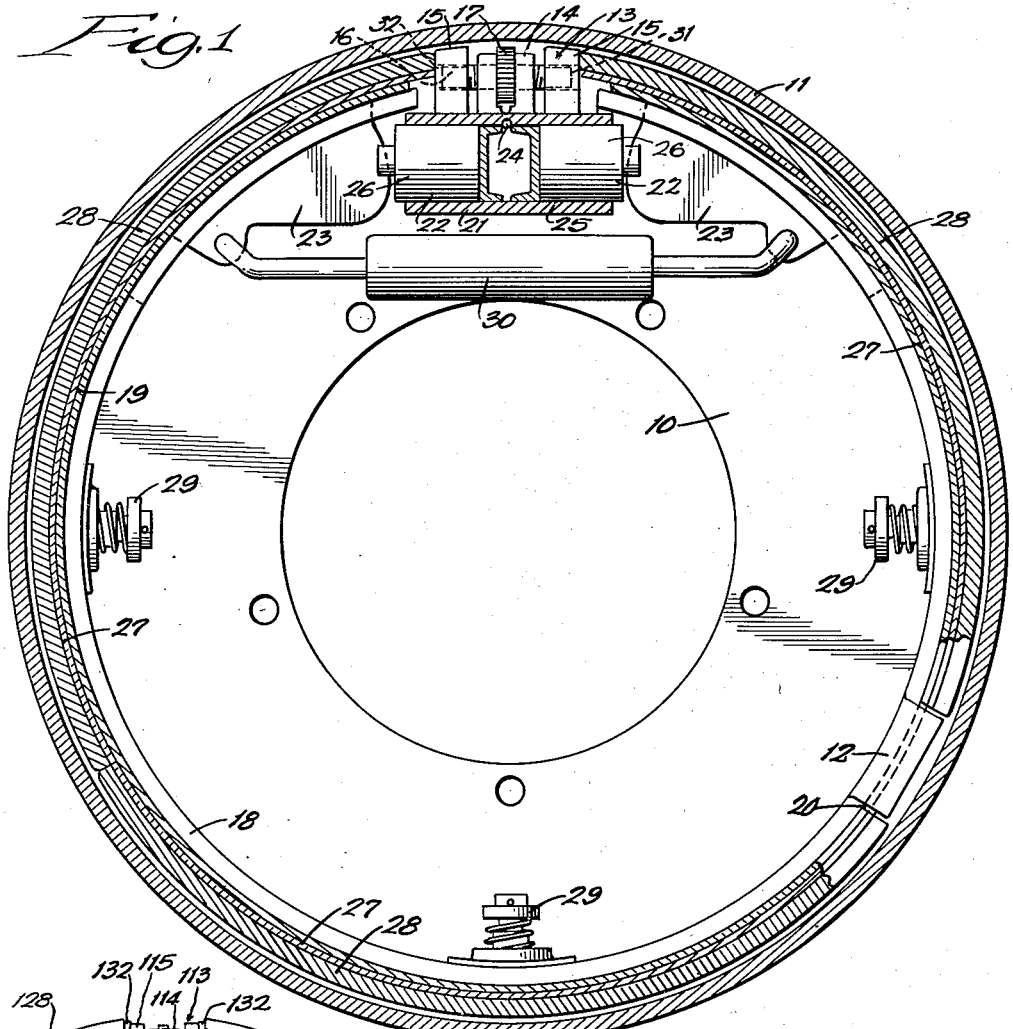
Figure 2:
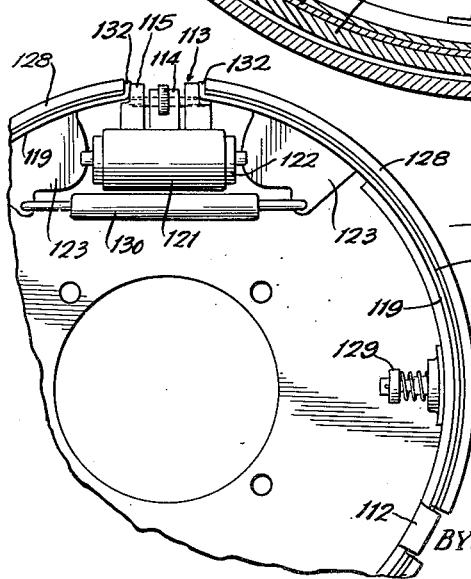

The above and other objects and advantages of the invention will be more readily apparent when read in connection with the accompanying drawing, in which, Figure 1 is a sectional view of a brake embodying the invention with parts in elevation; and Figure 2 is a similar view of an alternative construction.

The brake, as shown, comprises a support or backing plate 10 adapted to be fixedly mounted adjacent to a wheel on which a cylindrical drum 11 is carried. The support carries a pair of abutments 12 and 13 of which at least one is tangentially adjustable. As shown, the abutment 13 is constructed as more particularly described and claimed in my copending application Serial No. 725,369, filed January 30, 1947, with a central block 14 fixed to the support and slidable blocks 15 connected to the central block by reversely threaded shaft ends 16. The shaft 16 may be turned by a hand wheel 17 to adjust the relative tangential positions of the blocks 15 as will be apparent. The threads on the left end of shaft 16 may be twice as coarse as the threads on the right end thus to compensate for the difference in wear to be described.

The support also carries an annular or par-

2 tially annular supporting flange 18 over which a flexible operating band 19 is supported. The operating band 19 has its ends separated adjacent to the abutment 13 and actuating means are provided to spread the separated ends thereby to apply the brake. The band 19 may be notched to fit over the abutment 12, the notch as shown at 20 preferably being slightly longer than the abutment to provide a slight amount of clearance.

As shown, the actuating means comprises a more or less conventional hydraulic wheel cylinder 21 mounted on the backing plate adjacent to the abutment 13 and having pistons 22 slidable in its opposite ends and connected respectively through ears 23 to the ends of the operating band 19. The cylinder includes a liquid inlet 24 therein for admitting fluid to urge both pistons outward when liquid is supplied.

A series of brake segments or shoes overlie the operating band between the abutments and are adapted to be forced by the band into frictional engagement with the brake drum 11. These segments or shoes may be formed as more particularly described and claimed in my copending application Serial No. 737,251, filed March 20, 1947, now abandoned, and include backing or supporting strips 27 carrying a friction lining material 28 to engage the drum. Each of the segments or shoes may be identical.

As shown, the abutment 12 is spaced from the abutment 13 about 120° in the clockwise direction so that the circumferential distance between the abutments at one side is twice that at the other side. Therefore, in assembling the parts, two segments are placed between the abutments at the left side of the brake, as seen in the drawings, and a single segment is placed between the abutments at the right side of the brake. The two segments at the left side abut in end to end relationship to provide servo action in either direction of rotation.

The operating band and segments may be urged inward to brake released position by return spring units 29 and 30 which are preferably constructed as more particularly described and claimed in my copending application Serial No. 693,642, filed August 29, 1946. With this construction the return spring device not only urges the parts toward disengaged position but also provides an automatic adjustment of the brake clearance.

With the drum 11 turning in a counter-clockwise direction, as seen in the drawing, when the operating band is expanded and the several shoes are brought into engagement with the drum, the first shoe to the left of the abutment 13 will transmit its tangential force to the second shoe which in turn engages the abutment 12 to produce a servo action between these shoes. The single shoe between the abutments operates independently of the other shoes and does not have a servo action although it may be self-actuating. With rotation in the counterclockwise direction the single shoe engages the abutment 13.

The abutment 13 may be adjusted to minimize the necessary travel thereby minimizing the clicking or thumping effect. This construction also minimizes the relative motion between the operating band and the segments during a brake application so that the effect of friction between these parts will have a minimum or negligible effect on brake operation. Engagement of the band 19 with the abutment 12 also minimizes relative motion between the band and segments and the slight clearance will compensate for any errors in adjustment at the opposite sides of the abutment 13.

When the drum is rotating in the opposite direction the single segment to the right of the abutment 13 engages the abutment 12 and functions independently of the other segments. With this rotation the segment just to the left of the abutment 12 will transmit its tangential force to the upper left segment to provide a servo effect. It will be seen, therefore, that the brake functions well in either direction of rotation and that through the operating band the braking forces on the several segments are equalized.

Due to the manual adjustment at 17 being called upon to take up clearance caused by wear generated by two segments lying to the left and only one segment lying to the right side, it has been found advisable to employ right hand threads at the left end of shaft 16 of a coarser nature than the left hand threads employed at the right end of the shaft in order to compensate for the uneven clearance taking place on the two sides due to wear. A ratio of 2:1 may be employed; it answers the purpose in some cases very well.

In this way I have provided and illustrated one means whereby a brake may be made up of three identical segments of the type more fully set forth and described in my co-pending application No. 737,251, now abandoned, the segments being controlled or actuated by an underlying operating band and arranged so that the first segment acts as a primary segment, aiding the control band to actuate the second segment, arranged adjacent to the primary segment, the braking force of these two segments being imposed upon an abutment located following the trailing end of the second segment, thus to give a satisfactory amount of servo action to make the effort required to actuate the brake easy, but yet entirely controllable.

The third segment is located between two abutments so that it is self-actuating in either direction to the inherent degree that a segment is naturally self-actuating when unimpaired by either the abutment or the actuating means.

In addition to this very desirable arrangement I have provided return spring means with automatic clearance adjustors to function with my operating band. I have provided adjustment whereby the increasing tangential clearance may be taken up.

Figure 2 shows an alternative construction, parts therein corresponding to like parts in Figure 1 being indicated by the same reference numerals plus 100. In this construction the operating band 119 is free to move relative to the abutment 112 and its ends are turned outward as shown at 132 to lie between the adjustable abutment 113 and the ends of the adjacent segments. Otherwise the construction is the same as Figure 1.

The ends 132 of the band prevent movement of the segments relative to the band toward the abutment 113 without interfering with movement of the segments relative to the band away from abutment 113. This construction minimizes relative movement of the band and segments during operation in either direction and also minimizes clicking or thumping.

While two embodiments of the invention have been shown and described in detail herein, it will be understood that these are illustrative only and are not to be taken as a definition of the scope of the invention, reference being had for this purpose to the appended claims.

What is claimed is:

1. A brake comprising a support, a flexible operating band carried by the support with its ends separated, actuating means carried by the support to spread the ends of the band, a first abutment on the support adjacent to the actuating means, a second abutment on the support spaced from the first abutment, a single brake segment between the abutments at one side of the first abutment and slidably overlying the operating band, and a series of brake segments in series abutting relationship between the abutments at the other side of the first abutment and slidably overlying the operating band.

2. The construction of claim 1 in which each of the segments includes a flexible backing strip engaging the operating band and a lining of friction material carried by the backing strip.

3. The construction of claim 1 in which one of the abutments includes parts movable tangentially relative to each other, and means for adjusting the relative positions of the parts.

4. The constructon of claim 1 in which one of the abutments includes tangentially movable parts engaging the segments, and operating means to move one of the parts at a more rapid rate than the other.

5. The construction of claim 1 in which the operating band and the second abutment include interengaging parts to limit movement of the operating band.

6. The construction of claim 1 in which the first abutment includes tangentially adjustable parts and the operating band and second abutment include interengaging parts to limit circumferential movement of the band.

7. A brake comprising a support, a flexible operating band carried by the support with its ends separated, a first abutment carried by the support between the ends of the band to be engaged thereby, actuating means carried by the support adjacent to the first abutment and connected to the ends of the band to spread them, a second abutment on the support spaced from the first abutment, and brake segments between the abutments slidably overlying the operating band.

8. The construction of claim 7 in which the operating band and the second abutment include interengaging parts to limit circumferential movement of the operating band relative to the support.

9. A brake comprising a support, a flexible operating band carried by the support with its ends separated, a first abutment carried by the support between the ends of the band to be engaged thereby, actuating means carried by the support adjacent to the first abutment and connected to the ends of the band to spread them, a second abutment on the support spaced from the first abutment, brake segments between the abutments loosely overlying the operating band, and interengaging parts on the operating band and brake segments to limit movement of the segments relative to the operating band toward the first abutment without interfering with relative movement away from the first abutment.

10. The construction of claim 7 in which one of the abutments includes parts movable tangentially relative to each other, and means for adjusting the relative positions of the parts.

11. A brake comprising a support, a flexible operating band carried by the support with its ends separated, a first abutment carried by the support between the ends of the band to be engaged thereby, actuating means carried by the support adjacent to the first abutment and connected to the ends of the band to spread them, a second abutment on the support spaced from the first abutment, a single brake segment between the abutments at one side of the first abutment and slidably overlying the band and a pair of brake segments in series abutting relationship between the abutments at the other side of the first abutment and slidably overlying the band, and interengaging parts on the band and segments to limit movement of the segments relative to the band toward the first abutment without interfering with relative movement away from the first abutment.

12. The construction of claim 9 in which one of the abutments includes parts movable tangentially relative to each other, and means for adjusting the relative positions of the parts.

ADIEL Y. DODGE.

REFERENCES CITED

The following references are of record in the file of this patent:

UNITED STATES PATENTS

| Number | Name | Date |
|---|---|---|
| 1,746,057 | Sneed | Feb. 4, 1930 |
| 2,188,453 | Bock | Jan. 30, 1940 |